United States Patent [19]
Bader

[11] 3,906,329
[45] Sept. 16, 1975

[54] METHOD OF MEASURING THE CHARGE CONDITION OF GALVANIC ENERGY SOURCES AND APPARATUS FOR CARRYING OUT THIS METHOD

[75] Inventor: Christian Bader, Stuttgart, Germany

[73] Assignee: Firma Deutsche Automobilgesellschaft mbH, Germany

[22] Filed: Aug. 27, 1973

[21] Appl. No.: 391,774

[30] Foreign Application Priority Data
Aug. 30, 1972 Germany............................ 2242510
Mar. 9, 1973 Germany............................ 2311758

[52] U.S. Cl. ...................... 320/44; 320/31; 320/48; 324/29.5
[51] Int. Cl.² ..................... H02J 7/00; H01M 10/38
[58] Field of Search ................................ 320/37–40, 320/43–45, 48, 14, 35, 36; 324/29.5, 76 A

[56] References Cited
UNITED STATES PATENTS
3,421,067  1/1969  Wilson et al.......................... 320/14
3,484,681  12/1969  Grady, Jr. et al............. 320/44 UX
3,526,822  1/1970  Dickfeldt et al...................... 320/14

FOREIGN PATENTS OR APPLICATIONS
1,163,377  9/1969  United Kingdom................... 320/44

*Primary Examiner*—J. D. Miller
*Assistant Examiner*—Robert J. Hickey
*Attorney, Agent, or Firm*—Craig & Antonelli

[57] ABSTRACT

A method and apparatus for measuring the charge condition of galvanic energy sources by means of an integrating measuring device, in which the charging current or a magnitude proportional thereto is weighted with a factor dependent on the predetermined gassing voltage which changes with temperature and is matched in its timely behavior to the charging condition of the energy source, and possibly also by a factor dependent on the respective battery temperature and dependent of the charging condition, before it is fed to the integrating measuring device; the discharge current or a magnitude proportional thereto is thereby multiplied with a factor dependent on the respective battery temperature and subsequently is raised to the power with an exponent $(1 + m)$ whose term $m$ itself is variable as a function of the battery temperature before it is fed in its turn to the integrating measuring device.

24 Claims, 3 Drawing Figures

METHOD OF MEASURING THE CHARGE CONDITION OF GALVANIC ENERGY SOURCES AND APPARATUS FOR CARRYING OUT THIS METHOD

The present invention relates to a method for measuring the charge condition of galvanic energy sources by means of an integrating measuring device, known as such, and to an apparatus for carrying out this method. With the heretofore practically used method, the voltage of the galvanic energy source is used in part as measuring magnitude which is to characterize the charge condition, whereby in this measurement possibly also the magnitude of the discharge current will be taken into consideration to some extent, since from the battery voltage alone—especially in the currentless condition—in practice hardly any conclusion can be drawn with respect to the discharge condition of the battery. However, the latter influence, i.e., the discharge current is dependent on the internal resistance of the battery, whose value may change strongly with the discharge condition, the temperature and the type of the used battery so that also this indication supplies only inaccurate values and one is able to judge at all the discharge condition of the battery by this method only when at all a discharge current flows.

Other prior art methods for measuring the charge condition utilize integrating measuring devices(ampere-hour-meters), whereby the charging current will be taken into consideration possibly by weighting with a constant charge factor. The electric charge removed from the battery during the discharge can be accurately measured thereby. However, as is known, the entire charge which can be removed from the battery—i.e. its useful capacity—is dependent strongly from the magnitude of the discharge current and the temperature so that also with this prior art method in case strongly changing discharge currents, as is the case, e.g. for the drive batteries of electric vehicles, an indication of only little satisfaction can be made as to whether any utilizable capacity of the battery is still available at any point in time. Therebeyond, the physical conditions of the battery are only inadequately taken into consideration by the weighting of the charging currents with a constant charge factor since, as is known, the charge facgor or the charging efficiency depends strongly from the temperature and from the charge condition and strongly deteriorates especially when a gas development starts in the battery.

It has been discovered that the capacity K which can be removed from a battery, depends in the following manner from the discharge current I of the battery.

$$\frac{K}{K_5} = \left(\frac{I}{I_5}\right)^{-m}$$

The index 5 thereby characterizes the values which are valid respectively for the five-hour operation. The exponent $m$ is dependent on the type of the battery and has approximately the following values:

| | |
|---|---|
| Ni/Cd with sinter foil plates | $m \approx 0.15$ |
| Pb starter batteries | $m \approx 0.25$ |
| Pb traction batteries | $m \approx 0.33$ |

The indicated relationship exhibits for the range $I/I_5 = 1 \ldots 15$, which exists also, for example, with the drive of an electric vehicle, a completely satisfactory accuracy.

It is the aim of the present invention to provide a method which is capable to indicate more accurately the charge condition of galvanic energy sources than is possible with the hitherto used methods.

The underlying problems are solved according to the present invention in that the charging current or a magnitude proportional thereto is weighted with a charge factor dependent from the predetermined gassing voltage changing with temperature and matched in its timely behavior to the charge behavior of the energy source—and possibly with a factor dependent from the respective battery temperature and dependent of the charge condition—before it is supplied to the integrating measuring device, and in that the discharge current or a magnitude proportional thereto is multiplied with a factor dependent on the respective battery temperature and subsequently is raised to a power with an exponent $(1+m)$ whose summand or term $m$ itself is variable as a function of the battery temperature, before it is fed, in its turn, to the integrating measuring device. If one feeds according to the present invention to an integrating measuring device a voltage proportional to the discharge current which, however, prior to integration was raised to a power with the exponent $(1+m)$, then also the scale of the measuring device which is calibrated approximately in per cent, will accurately reproduce the respective fraction of the utilizable battery capacity which is still available. It should also be noted that the exponent $m$ will be influenced to a far lesser degree from aging processes in the battery than the internal resistance of the battery used for purposes of measuring in the method described hereinabove.

A voltage proportional to the charging current which has an opposite sign as the corresponding voltage during discharge, is fed directly, i.e., with the exponent 1, to the integrating measuring device. The charging current is weighted with a charge factor of approximately one for such length of time as the battery voltage does not exceed the predetermined temperature dependent gassing tension or voltage. Upon exceeding this voltage threshold, the weighting of the charging current is decreased to zero with a time-delay matched to the battery, i.e., the charging quantity which is supplied to the battery, when its gas development has started, is registered only with a fraction or not at all by the measuring device. This method corresponds to the physical conditions existing in lead batteries. In batteries with different types of charging behaviors, the present invention can be readily so modified that the weighting of the charging current is reduced continuously dependent on the charge condition, which is indicated by the integrating measuring device, and possibly in dependence on the temperature since, as is known, the charge factor, i.e., the ratio of the charge fed to the battery with respect to the charge stored therein increases with a continuing charging operation.

In order to take into consideration the behaviour of the utilizable battery capacity in a wider temperature range, according to a further feature of the present invention, on the one hand, the value of the exponent $m$ is increased with a decreasing temperature—in a given application an increase of $m$ by about 15 percent resulted when the temperature was decreased from 20°C.

to −20°C.—and on the other, the voltage proportional to the discharge current receives an additional proportional increase in dependence on the temperature in order to take into consideration the decline of the utilizable battery capacity at low temperatures.

An apparatus for carrying out the method consists according to the present invention in that a voltage converter is provided which converts the actual battery voltage into a proportional voltage, in that a voltage divider is provided whose one partial resistance has a negative temperature coefficient and at the output tap of which a voltage proportional to the permissive gassing voltage can be picked up, in that an operational amplifier connected as voltage comparator is provided in which the voltage proportional to the the actual battery voltage can be compared with the voltage proportional to the permissive gassing voltage, in that a negative feedback condenser is connected between the output and the input of the voltage comparator and the output signal, which acts on a transistor, is matched in its timely behavior to the charging behavior of the energy source, in that furthermore a current converter is provided which converts the battery current into a proportional voltage and feeds the same to the input of an operational amplifier connected as proportional amplifier, by means of which the voltage proportional to the charging current is multiplied by way of a first negative feedback network with a constant factor and subsequently is multiplied by way of the collector-emitter circuit of the transistor with a factor between zero and one dependent on the output signal of the voltage comparator before it reaches the input of an operational amplifier, and in that the voltage proportional to the discharge current is multiplied with a factor dependent on the battery temperature by way of a second negative feedback network in which the resistance has a negative temperature coefficient and subsequently is raised to a potential with the factor $1 + m$ by way of a parallel circuit of a resistor with a resistance dependent on the voltage, before it reaches in its turn the input of the operational amplifier which supplies to the integrating measuring device of conventional construction an output current proportional to the sum of the input voltages owing to the circuit connection with the resistances.

According to the present invention, the integrating measuring device described so far is equipped with a warning signal installation which produces a signal when the available battery capacity drops below a predetermined minimum value.

In the method and apparatus described so far, the entire charging current as well as the instantaneous discharge current, weighted with corresponding factors, are fed to the integrating measuring device. If the accuracy of such method and apparatus is still too inadequate, then more accurate results can be obtained by a modified embodiment of a method and apparatus in accordance with the present invention in which certain measures for the battery control and for the charging current control are incorporated into the system.

The underlying problems as regards greater accuracy are solved in that the charging current $I_L$ which is reduced by the proportion $I_{GAS}$ dependent on the difference $U_B - U_{GAS}$ as well as the average value of the discharge current $I_{ENTL}$ raised to the power with the exponent $1 + m$ or magnitudes proportional thereto are fed to the integrating measuring device.

It has been discovered that the gas development at a certain temperatute during charging of galvanic energy sources is dependent essentially on the terminal voltage of the battery. At different temperatures, a characteristic, temperature-dependent gassing voltage can be indicated for the respective battery type. The gas development then represents a function of the difference of the battery terminal voltage $U_B$ to this gassing voltage $U_{GAS}$. The solution of the present invention takes into consideration this relationship. As a result thereof, the charging condition reached by the charging operation, i.e., the useful electric charge stored in the battery, is measured more accurately than with the method of the present invention described hereinabove in which the charging current remains completely neglected when exceeding the gassing voltage—possible with a time delay.

These measures are of interest, in particular, in connection with galvanic energy sources with alkaline electrolytes in which, as is known, the gassing voltage must always be exceeded for purposes of charging so that with these batteries only a portion of the charging current is always stored in the battery whereas with lead batteries practically the entire charging current is stored in the battery up to reaching the gassing voltage.

It is more favorable not to raise the instantaneous values of the discharging current to the power with the exponent $1 + m$ and then to feed the same to the integrating measuring device, but instead to undertake the exponential formation with the arithmetic average value of the discharge current. The integration time-constant is thereby dependent from the type of the battery, but for the most part lies within the minute range. As a result thereof with pulse-shaped loads having current peaks of very short duration, as may occur, for example, when the battery feeds a D.C. motor by way of a D.C. control unit, only the timely average value thereof is raised to the indicated power. This correponds somewhat more accurately to the physical conditions of the battery than the method described hereinabove, by means of which the instantaneous values of the peak currents were raised to the indicated power since also the battery behaves like a capacity with respect to peak currents of very short duration and therewith its capacity decrease is determined by the arithmetic average value of the discharge current.

Provision is made as measure for the battery control that the proportion $I_{GAS}$ of the charging current which serves for the gas development, or a magnitude proportional thereto is fed to a further integrating measuring device. As a result thereof, the loss of the electrolyte caused by the gassing is detected.

A further feature of the present invention resides in that the charging current $I_L$ is so controlled by an integrating control device that the temperature-dependent gassing voltage $U_{GAS}$ can be exceeded only when the charging current $I_L$ lies below a value dangerous as regards gassing.

An apparatus according to the present invention for carrying out this improved method resides in that a proportional difference amplifier with time delay is provided which forms from the magnitudes battery voltage $U_B$ and gassing voltage $U_{GAS}$ which are detected in a conventional manner, the difference voltage $U_B - U_{GAS}$ or a magnitude proportional thereto, in that a function generator follows the difference amplifier which produces from the difference voltage $U_B - U_{GAS}$ a magnitude proportional to the gassing current $I_{GAS}$, in that a further proportional difference amplifier is provided which forms from a magnitude detected in a conventional manner in a proportional amplifier by way of a first negative feedback network and proportional to the charging current $I_L$ and from the magnitude proportional to the gassing current $I_{GAS}$, a magnitude proportional to the difference $I_L - I_{GAS}$ which is fed, possibly by way of further intermediate stages, to the integrating measuring device and in that the magnitude determined in the proportional amplifier by way of a second negative feedback network and proportional to the average value of the discharge current $I_{ENTL}$ is fed, possibly by way of further intermediate stages, to the integrating measuring device after it is raised to a power with an exponent $1 + m$ in a conventional manner.

The loss of the electrolyte of the battery caused by the gassing is detected in that the proportion $I_{GAS}$ of the charging current $I_L$, which serves for the gas development or a magnitude proportional thereto is fed to the input of an operational amplifier which owing to the circuit connection with the resistances supplies an output current proportional to the input magnitude to a further integrating measuring device.

The necessity of occurring service operations (for example, re-filling of distilled water) can be indicated in that the integrating measuring device is equipped with a warning signal installation which produces a signal when the electric charge corresponding to the entire gas development and representing a measure for the electrolyte quantity of the battery which is used up by reason of the gassing, exceeds a predetermined value.

According to the present invention, an integral control device of conventional construction is provided, to the input of which is fed the magnitude proportional to the voltage difference $U_B - U_{GAS}$ and at the output of which appears a magnitude proportional to the desired value of the charging current $I_L$; the charging current control device with current-limiting means follows the integral control device which compares with each other the desired value and the existing value of the charging current $I_L$ or magnitudes proportional thereto and which makes available the amplified difference magnitude as control magnitude for controlling a charging apparatus.

Accordingly, it is an object of the present invention to provide a method and apparatus for measuring the charge condition of galvanic energy sources which avoids by simple means the aforementioned shortcomings and drawbacks encountered in the prior art.

Another object of the present invention resides in a method and apparatus for measuring the charge condition of galvanic energy sources which provides a more realistic and more accurate indication of the charge condition and of the utilizable battery capacity under all operating conditions.

A further object of the present invention resides in a method and apparatus of the type described above which provides a more accurate indication of the charge condition of galvanic energy sources.

A still further object of the present invention resides in a method and apparatus for indicating the charge condition of galvanic energy sources which is reliable in operation, utilizes relatively few, commercially available parts and can be readily installed in proximity to the galvanic energy sources.

These and other objects, features and advantages of the present invention will become more apparent from the following description when taken in connection with the accompanying drawing which shows, for purposes of illustration only, two embodiments in accordance with the present invention, and wherein.

Figure 1:
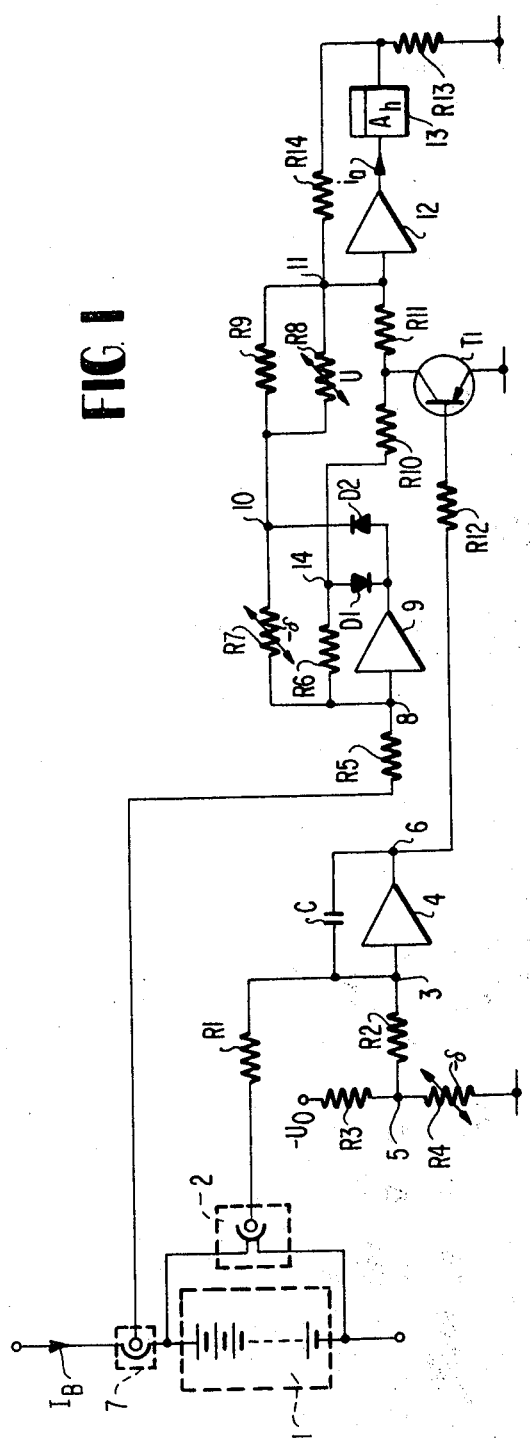
FIG. 1 is a schematic circuit diagram of a first embodiment of an apparatus for carrying out the method of measuring the charge condition of galvanic energy sources in accordance with the present invention.

Referring now to the drawing wherein like reference numerals are used throughout the various views to designate like parts, and more particularly to FIG. 1, the voltage of the battery 1 to be monitored is fed by way of a voltage converter 2 of conventional construction and by way of a resistor $R_1$ to the input terminal 3 of a conventional operational amplifier 4. Simultaneously, the input of the operational amplifier 4 is connected by way of the resistor $R_2$ with the point 5 of the voltage divider consisting of the resistors $R_3$ and $R_4$ whereby $R_4$ is a resistance with negative resistance characteristics so that the potential of the point 5 with decreasing temperature and with suitable values of $R_3$ and $R_4$ decreases to the same extent as the permissive gassing voltage of the battery 1 increases with decreasing temperature. The negative feedback condenser C matches the timely behavior of the output voltage of the amplifier 4 at the terminal 6 to that of the battery. The voltage at the terminal 6 itself is negative in the indicated circuit when the battery exceeds the gassing voltage.

The current of the battery is detected with the correct sign in the current converter 7 of conventional construction and is fed by way of the resistor $R_5$ to the input terminal 8 of the amplifier 9. The negative feedback network of this amplifier consists, on the one hand, of the resistor $R_6$ and the diode $D_1$; it becomes effective when the voltage produced by the current converter 7 is positive, whereby the battery current $I_B$ then should also be positive and therewith serves for the charging of the battery. The portion of the negative feedback network consisting of the resistor $R_7$ and of the diode $D_2$ influences the measurement of the discharge current of the battery. The basic temperature behavior of the resistor $R_7$ thereby coincides with that of the resistor $R_4$ so that the output voltage of the amplifier 9 at the point 10, with a constant discharge current of the battery, increases with a decreasing temperature whereby with suitable selection of the resistor $R_7$ the temperature-dependence of the battery capacity utilizable during discharge is taken into consideration. The voltage of the terminal 10 is fed by way of the parallel connection of the voltage-dependent resistor $R_8$ and of the resistor $R_9$ to the input terminal 11 of the amplifier 12. This parallel connection consisting of a voltage-dependent resistor $R_8$ and of a voltage-independent resistor $R_9$ realizes the relationship that the measurement of the discharge current which was weighted already in accordance with the temperature, is raised to a power with an exponent $1 + m$ in order to detect the retrogression of the utilizable battery capacity at higher discharge currents.

The parallel circuit is necessary for the adjustment of the exponent $1 + m \approx 1.15 \ldots 1.33$ since for manufacturing reasons only approximately the value 2 can be realized for voltage-dependent resistors. Simultaneously, the voltage proportional to the charging current is fed from the terminal 14 to the terminal 11 by way of the resistors $R_{10}$ and $R_{11}$ which serve for the adjustment of the charge factor. The transistor $T_1$ effective as input voltage divider thereby increases the charge factor, i.e., decreases the input voltage proportional to the charging current, when the voltage at the terminal 6 becomes negative or the battery exceeds the gassing voltage. An ouput current $i_a$ proportional to the corresponding sum of the input voltages of the amplifier 12 results with the aid of the resistors $R_{13}$ and $R_{14}$, which output current $i_a$ is fed to an integrating measuring device 13 of conventional construction which may consist, for example, of an ampere-hour-meter.

The circuit illustrated in principle is to be considered as representing only one possibility for realizing the inventive concept; it is, of course, quite possible that for the realization of the present invention, also other circuit means with corresponding characteristics can be used in lieu of the voltage-dependent and temperature-dependent resistors. The entire arrangement, which is advantageously constructed by means of integrated circuits and then exhibits only an insignificant volume, appropriately together with the current converter which may be constructed, for example, as shunt, is directly installed at the battery. One is then able to bring the temperature sensors of the circuit, for example, the resistors $R_4$ and $R_7$ into a good thermal contact with the metallic parts of the battery and thus detect the temperature of the electrodes which is characteristic for the behavior of the batteries. The electric supply of the circuit can thereby also be assumed at the same time by the battery since this additional load will be hardly of any significance by reason of the slight power input of the circuit.

The integrating measuring device itself and/or the indication thereof may, of course, be installed at any place suitable therefor.

In case of a battery exchange—for example, in an electric vehicle—only the two measuring lines of the measuring device merely have to be unplugged when the entire circuit is securely combined with the battery.

Figure 2:
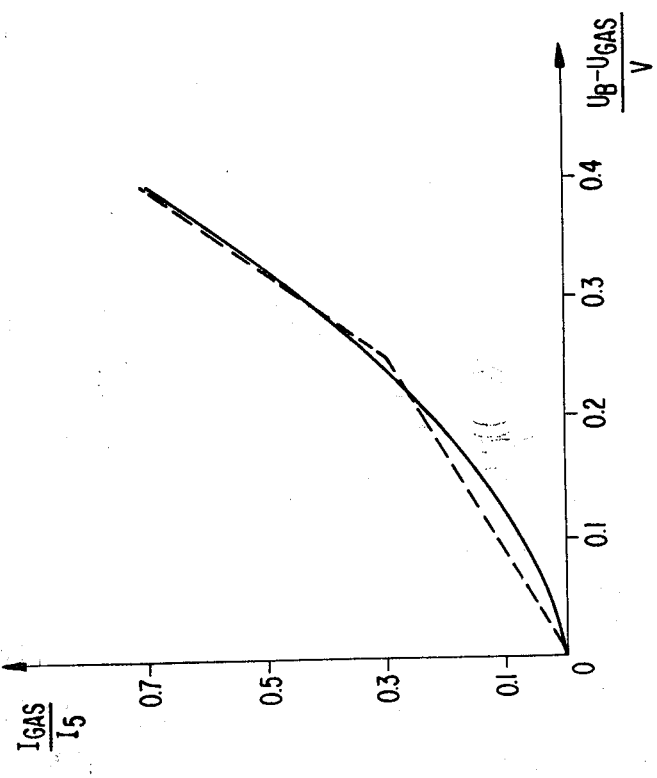
FIG. 2 is a diagram indicative of the gas development.

Referring now the embodiment of FIGS. 2 and 3, it is again noted that the gas development during the charging of galvanic energy sources at a predetermined temperature depends practically only from the respective terminal voltage $U_B$ of the battery. At different temperatures, the characteristic temperature-dependent gassing voltage can be indicated for the respective battery type. The gas development then represents a function of the difference of the battery terminal $U_B$ to this gassing voltage $U_{GAS}$. The relationship determinative for lead batteries is indicated in FIG. 2, whereby the respective gas development has been converted with the aid of the electrochemical equivalent into a corresponding current $I_{GAS}$ in relation to the 5-hour discharge current $I_5$ of the battery. Similar relationships can be readily determined for other types of batteries.

Figure 3:
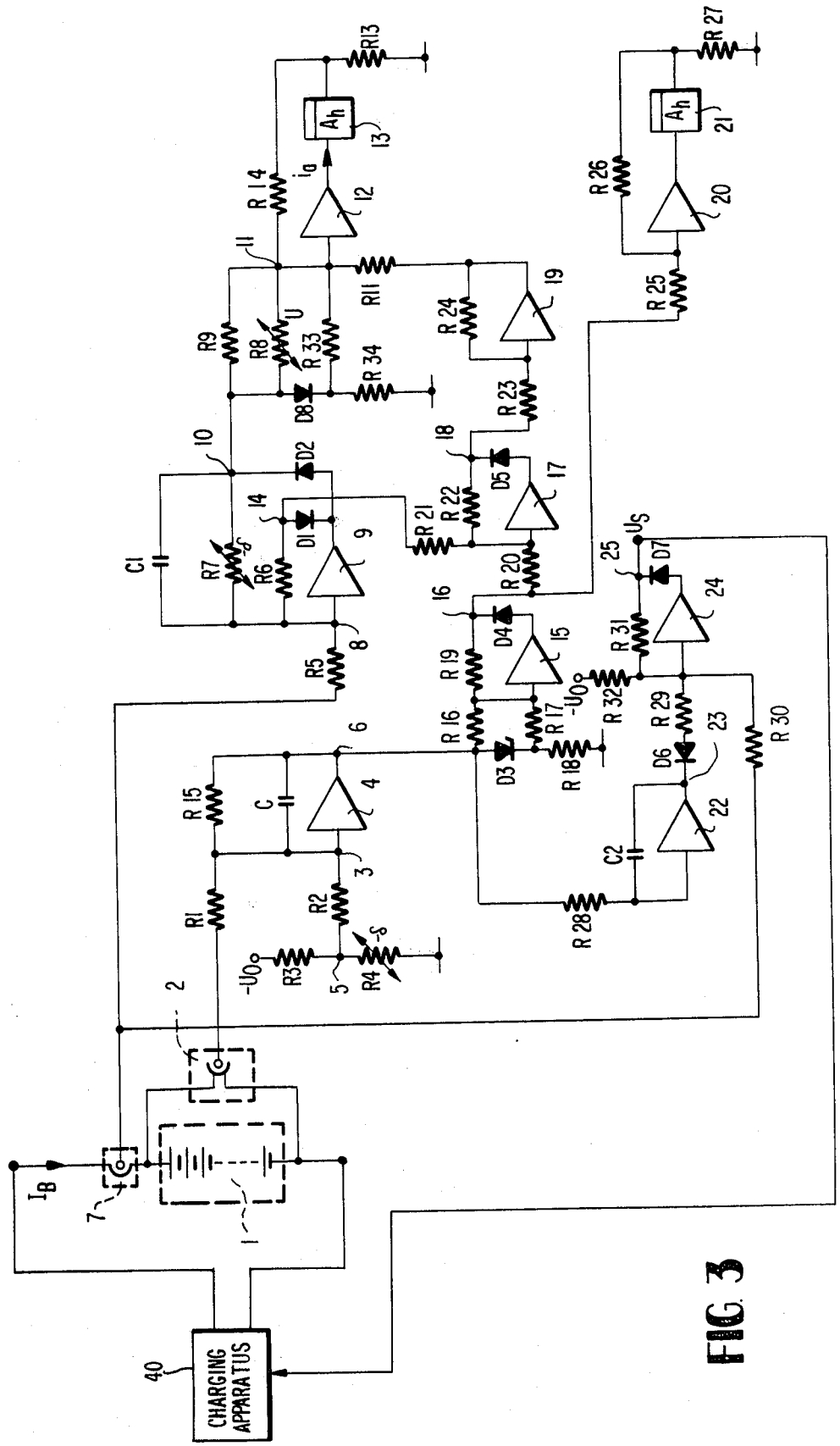
FIG. 3 is a schematic circuit diagram of a modified apparatus in accordance with the present invention.

In FIG. 3, the schematic circuit diagram of a modified embodiment according to the present invention is illustrated as another example. The voltage of the battery 1 to be monitored is again fed to the input terminal 3 of an amplifier 4 by way of a voltage converter 2 and a resistor $R_1$. Simultaneously, the input 3 is additionally connected with the point 5 of the voltage divider consisting of the resistors $R_3$ and $R_4$ by way of the resistor $R_2$ whereby $R_4$ is a resistance with negative resistance characteristics so that the voltage of the point 5, with a decreasing temperature and suitable values of $R_3$ and $R_4$, decreases to the same extent as the permissive gassing voltage $U_{GAS}$ of the battery 1 increases with decreasing temperature. The amplifier 4, owing to the circuit connection with the resistor $R_{15}$ and condenser C, forms a proportional difference amplifier with time-delay. The timely behavior of the output voltage is matched to that of the battery by the negative feedback condenser C. A voltage proportional to the difference voltage $U_B - U_{GAS}$ can be picked up at the output 6 of the amplifier 4. The shape of the characteristic curve according to FIG. 2 is approximated by two straight lines as indicated in FIG. 2 in dash line with the aid of the resistors $R_{16}$, $R_{17}$ and $R_{18}$ as well as the Zener diode $D_3$ which form a function generator. It can be seen from the diagram of FIG. 2 that the breakdown voltage of the Zener diode $D_3$ in the instant case has to be selected proportional to $U_B - U_{GAS} = 0.25$ V, whereby the proportionality factor is determined by the amplification of the amplifier 4.

In conjunction with the amplifier 15 and the resistor $R_{19}$ a voltage thereby results at point 16 which is proportional to the respective value of the gassing current $I_{GAS}$ whereby it is avoided by means of the diode $D_4$ that this voltage becomes $<0$ since also $I_{GAS}$ cannot become $<0$.

The current of the battery is detected with correct sign in the current converter 7 and is fed by way of the resistor $R_5$ to the input terminal 8 of the amplifier 9. The negative feedback network of this amplifier 9 consists, on the one hand, of the resistor $R_6$ and of the diode $D_1$; it becomes effective when the voltage produced by the current converter 7 is positive whereby the battery current $I_B$ then also should be positive and therewith serves for charging the battery.

By reason of the circuit connection with the resistors $R_{20}$, $R_{21}$ and $R_{22}$ the amplifier 17 brings about at the point 18 a voltage which is proportional to the difference of the charging current and the current proportion which corresponds to the developed gas quantity and therefore is not stored in the battery. For the voltage at the point 16 proportional to $I_{GAS}$ can assume only positive values whereas the voltage at the point 14 proportional to the charging current $I_B$ can only be negative by reason of the diode $D_1$. The diode $D_5$ thereby prevents that the voltage at the point 18 becomes negative since, of course, during charging the following relationship must always be valid: $I_B \geq I_{GAS}$.

Amplifier 19 effects together with the resistors $R_{23}$ and $R_{24}$ a sign reversal of the voltage at point 18 in order to feed the voltage proportional to the charging current which possibly was corrected by $I_{GAS}$, with the correct sign by way of the resistor $R_{11}$ and the amplifier 12 to the integrating measuring device 13 for the charging condition.

The part of the negative feedback network consisting of the resistor $R_7$, of the diode $D_2$ and of the condenser $C_1$ influences the measurement of the discharge current of the battery. The basic temperature behavior of the resistor $R_7$ thereby coincides with that of the resistor $R_4$ so that the output voltage of the amplifier 9 at the point 10, with a constant discharge current of the battery, increases with decreasing temperature, whence with a suitable selection of the resistor $R_7$, the temperature dependence of the battery capacity utilizable during discharge is taken into consideration.

The capacitor $C_1$ forms together with the temperature-dependent resistor $R_7$ the arithmetic average value of the discharge current whereby the time constant lies for the most part within the minute range, in order to detect the influence of current peaks of very short duration in the discharge current with the same time delay as the battery.

The voltage of the terminal 10 is fed by way of the circuit of the voltage-dependent resistor $R_8$, of the resistors $R_9$, $R_{33}$, $R_{34}$ and of the diode $D_8$ to the input terminal 11 of the amplifier 12. This parallel circuit consisting of a voltage-dependent resistor $R_8$ and a voltage-independent resistor $R_9$ realizes the relationship that the measurement of the discharge current which was weighted already in accordance with the temperature, is raised to a power with the exponent $1 + m$ in order to detect the decline of the utilizable battery capacity at higher discharge currents.

The parallel circuit is necessary for the adjustment of the exponent $1 + m \approx 1.15 \ldots 1.33$ since for manufacturing reasons only approximately the value 2 can be realized as lowest exponent for voltage-dependent resistances.

An improvement in the accuracy during the operation of raising the voltage proportional to the discharge current to a power with the exponent $(1 + m)$ is achieved by the voltage divider which is formed by the diode $D_8$ and the resistor $R_{34}$, whereby the center point of the voltage divider is connected by way of the resistor $R_{33}$ with the input point 11 of the amplifier 12. As a result thereof, discharge currents which amount to less than 10 percent of the maximum discharge current can be still detected with sufficient accuracy.

With the aid of the resistors $R_{13}$ and $R_{14}$, an output current $i_a$ proportional to the corresponding sum of the input voltages of the amplifier 12 results which is fed to an integrating measuring device 13 which may consist, for example, of an ampere-hour-meter.

The amplifier 22 represents in the circuit connection with the resistance $R_{28}$ and capacity $C_2$ an integral control device in order that during the charging of the drive battery by a charging apparatus, the temperature-dependent gassing voltage can be maintained accurately. A minimum of the charging time can be achieved thereby with far-reaching protection of the battery. The voltage at the point 23 is proportional to the desired value of the charging current and is compared by way of the resistors $R_{29}$ and $R_{30}$ with the existing value of the charging current which is measured by the current converter 7. The amplifier 24 amplifies thereby the difference between the desired and the existing value with the aid of the resistor $R_{31}$ and then supplies at the output 25 a control voltage $U_S$ which influences the charging apparatus 40 correspondingly. The diode $D_6$ prevents the application of a negative desired value for the charging current which would occur when the fully charged battery threatens to exceed the gassing voltage. In this case, additionally, a very small charging-current desired-value is applied by way of the resistor 32 independently of the respective battery voltage which, with lead batteries, corresponds approximately to $0.1 \cdot I_5$ and effects a compensation charge. The diode $D_7$ prevents a negative application of the control voltage $U_S$ in order to avoid thereby also a possibly negative voltage at the battery charging apparatus.

The voltage at the point 16 proportional to $I_{GAS}$ is fed by way of the amplifier 20 with the aid of the resistors $R_{25}$, $R_{26}$ and $R_{27}$ to a further integrating measuring device 21. The indication thereof is therewith proportional to the electric charge which corresponds to the entire gas development. The measuring apparatus 21 is formed, for example, by a galvanic measuring cell whose indication is proportional to the electric charge quantity which has flown through the measuring cell and which is provided with a warning signal device which produces a signal when, as a result of gassing, an excessive amount of electrolyte has been used up and a refilling becomes necessary.

The basic circuit illustrated in FIG. 3 is again to be considered only as one possibility for realizing the inventive concept; it is, of course understood that for purposes of realizing the present invention, also other circuit means with corresponding characteristics can be used in lieu of the voltage- and temperature-dependent resistors and/or of the function generator.

Typical values for the various components of the illustrated circuits, which are indicated for exemplary purposes only, are as follows:

| | | |
|---|---|---|
| Operational Amplifier | Type 741 | |
| Transistor T 1 | 2 N 3702 | |
| Diodes D1 2, 4–8 | 1 N 4148 | |
| Diode D 3 | ZF 3, 9 | |
| Capacitors | $C = 1 \mu F$ | |
| | $C_1 = 2 \mu F$ | |
| | $C_2 = 10 \mu F$ | |
| Resistors | $R_1 = 680$ kOhm | |
| | $R_2 = 680$ kOhm | |
| | $R_3 = 5, 6$ kOhm | |
| | $R_4 = 15$ kOhM | $\Theta=25°C$. NTC-Resistance |
| | $R_5 = 4, 3$ kOhm | |
| | $R_6 = 330$ kOhm | |
| | $R_7 = 330$ kOhm | $\Theta=25°C$. NTC-Resistance |
| | $R_8 \beta = 0, 5$ | at 6V, 1 mA VDR-Resistance |
| | $R_9 = 39$ kOhm | |
| | $R_{10} = 15$ kOhm | |
| | $R_{11} = 10$ kOhm | |
| | $R_{12} = 39$ kOhm | |
| | $R_{13} = 100$ Ohm | |
| | $R_{14} = 6, 2$ kOhm | |
| | $R_{15} = 1, 8$ MOhm | |
| | $R_{16} = 68$ kOhm | |
| | $R_{17} = 27$ kOhm | |
| | $R_{18} = 10$ kOhm | |
| | $R_{19} = 33$ kOhm | |
| | $R_{20} = 2, 2$ MOhm | |
| | $R_{21} - R_{24} = 100$ kOhm | |
| | $R_{25} = 8, 2$ MOhm | |
| | $R_{26} = 5, 1$ kOhm | |
| | $R_{27} = 100$ Ohm | |
| | $R_{28} = 1$ MOhm | |
| | $R_{29} = 270$ kOhm | |
| | $R_{30} = 330$ Ohm | |
| | $R_{31} = 270$ kOhm | |
| | $R_{32} = 12$ MOhm | |
| Voltages | $U_o = 20$ V. | |

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A method for measuring the charge condition of galvanic energy sources by means of an integrating measuring device, comprising the steps of sensing the charging and discharging current providing a signal therefrom having a magnitude at least substantially proportional to the charging current and a signal having a magnitude at least substantially proportional to the discharge current, weighting the signal magnitude which is at least substantially proportional to the charging current with a charge factor dependent on the predetermined gassing voltage, which is variable with temperature, and matched in its timely behavior to the charge condition of the energy source before feeding it to the integrating measuring device, multiplying the signal magnitude at least substantially proportional to the discharge current with a factor dependent on the respective battery temperature and subsequently raising the thus multiplied signal magnitude to a power with an exponent formed by a sum of terms, whose one term itself is variable dependent on the battery temperature, before it is in turn fed to the integrating measuring device, weighting the signal magnitude at least substantially proportional to the charging current with a factor dependent on the respective battery temperature and dependent on the charge condition before it is fed to the integrating measuring device, and feeding the signal magnitude at least substantially proportional to the charging current reduced by the proportion of the gassing current which is dependent on the difference between the battery terminal voltage and the gassing voltage, as well as a signal magnitude proportional to the average value of the discharge current raised to the power having said exponent to the integrating measuring device.

2. A method according to claim 1, further comprising the step of feeding the magnitude at least substantial proportional to the portion of the charging current serving for the gas development to a further integrating measuring device.

3. A method according to claim 2, characterized by so controlling the charging current by an integrating control device that the temperature dependent gassing voltage can be exceeded only when the charging current lies below a value dangerous with respect to the gassing.

4. A method for measuring the charge condition of galvanic energy sources by means of an integrating measuring device, comprising the steps of sensing the charging and discharging current providing a signal therefrom having a magnitude at least substantially proportional to the charging current and a signal having a magnitude at least substantially proportional to the discharge current, weighting the signal magnitude which is at least substantially proportional to the charging current with a charge factor dependent on the predetermined gassing voltage, which is variable with temperature, and matched in its timely behavior to the charge condition of the energy source before feeding it to the integrating measuring device, multiplying the signal magnitude at least substantially proportional to the discharge current with a factor dependent on the respective battery temperature and subsequently raising the thus multiplied signal magnitude to a power with an exponent formed by a sum of terms, whose one term itself is variable dependent on the battery temperature, before it is in turn fed to the integrating measuring device, and feeding the signal magnitude at least substantially proportional to the charging current reduced by the proportion of the gassing current which is dependent on the difference between the battery terminal voltage and the gassing voltage, as well as a signal magnitude proportional to the average value of the discharge current raised to the power having said exponent to the integrating measuring device.

5. A method according to claim 4, further comprising the step of feeding the magnitude at least substantial proportional to the portion of the charging current serving for the gas development to a further integrating measuring device.

6. A method according to claim 5, characterized by so controlling the charging current by an integrating control device that the temperature dependent gassing voltage can be exceeded only when the charging current lies below a value dangerous with respect to the gassing.

7. A method according to claim 4, characterized in that said proportional magnitudes are the charging current and the discharge current.

8. A method for measuring the charge condition of galvanic energy sources by means of an integrating measuring device, comprising the steps of sensing the charging and discharging current providing a signal therefrom having a magnitude at least substantially proportional to the charging current and a signal having a magnitude at least substantially proportional to the discharge current, weighting the signal magnitude which is at least substantially proportional to the charging current with a charge factor dependent on the predetermined gassing voltage, which is variable with temperature, and matched in its timely behavior to the charge condition of the energy source before feeding it to the integrating measuring device, multiplying the signal magnitude at least substantially proportional to the discharge current with a factor dependent on the respective battery temperature and subsequently raising the thus multiplied signal magnitude to a power with an exponent formed by a sum of terms, whose one term itself is variable dependent on the battery temperature, before it is in turn fed to the integrating measuring device, and feeding the signal magnitude at least substantially proportional to the portion of the charging current serving for the gas development to a further integrating measuring device.

9. A method for measuring the charge condition of galvanic energy sources by means of an integrating measuring device, comprising the steps of sensing the charging and discharging current providing a signal therefrom having a magnitude at least substantially proportional to the charging current and a signal having a magnitude at least substantially proportional to the discharge current, weighting the signal magnitude which is at least substantially proportional to the charging current with a charge factor dependent on the predetermined gassing voltage, which is variable with temperature, and matched in its timely behavior to the charge condition of the energy source before feeding it to the integrating measuring device, multiplying the signal magnitude at least substantially proportional to the discharge current with a factor dependent on the respective battery temperature and subsequently raising the thus multiplied signal magnitude to a power with an exponent formed by a sum of terms, whose one term itself is variable dependent on the battery temperature, before it is in turn fed to the integrating measuring device, and controlling the charging current by an integrating control device so that the temperature dependent gassing voltage can be exceeded only when the charging current lies below a value dangerous with respect to the gassing.

10. An apparatus for measuring the charge condition of galvanic energy sources by an integrating measuring means, characterized by weighting means for weighting a magnitude at least substantially proportional to the charging current with a charge factor dependent on the predetermined gassing voltage, which changes with temperature, and matched in its timely behavior substantially to the charging behavior of the energy source, means for feeding the thus weighted magnitude to the integrating measuring means, multiplying means for multiplying a magnitude at least substantially proportional to the discharge current with a factor substantially dependent on the prevailing battery temperature, further means operatively connected with said multiplying means for raising the multiplied magnitude to a power having an exponent formed by a sum of terms, one of said terms being itself variable substantially as a function of the battery temperature, and connecting means operatively connected to the output of said further means for feeding the thus-modified magnitude to the integrating measuring means.

11. An apparatus according to claim 10, characterized by means for reducing the magnitude at least substantially proportional to the charging current by the portion of gassing current dependent on the difference between the battery terminal voltage and the gassing voltage, said further means being operable to raise the average value of the magnitude at least substantially proportional to the discharge current to the power with said exponent, and both said reduced magnitude as well as said average value of the discharge current raised to said exponent power being fed to said integrating measuring means.

12. An apparatus according to claim 11, characterized in that said proportional magnitudes are the reduced charging current as well as said average value raised to the power with said exponent.

13. An apparatus according to claim 11, characterized by means for feeding the magnitude at least substantially proportional to said portion of the charging current serving for the gas development to a further integrating measuring means.

14. An apparatus according to claim 13, characterized by an integrating control means for so controlling the charging current that the temperature-dependent gassing voltage can be exceeded only when the charging current lies below a value dangerous as regards gassing.

15. An apparatus according to claim 10, which comprises a voltage converter means converting the actual battery voltage into a proportional voltage, a voltage divider means whose one partial resistance has a negative temperature coefficient and includes a tap means at which a voltage can be picked up proportional to the permissive gassing voltage, an operational amplifier means connected as voltage comparator in which the voltage proportional to the actual battery voltage is adapted to be compared with the voltage proportional to the permissive gassing voltage, a negative feedback condenser means operatively connected between the output and input of the voltage comparator with the output thereof operatively connected with a transistor means, the output signal of said voltage comparator which acts on said transistor means being matched in its timely behavior to the charge condition of the energy source, a current converter means which converts the battery current into a proportional voltage and feeds the same to the input of an operational amplifier means connected as proportional amplifier, means including said last-mentioned operational amplifier and a first negative feedback network means for multiplying the voltage proportional to the charging current with a substantially constant factor and for subsequently multiplying the voltage proportional to the charging current by way of the collector emitter circuit of the transistor means with a factor between zero and about one dependent on the output signal of the voltage comparator, means for feeding the thus-multiplied signal to the input of an operational amplifier means, further multiplying means including a second negative feedback network means having a resistance with a negative temperature coefficient for multiplying the voltage proportional to the discharge current with a factor substantially dependent on the battery temperature and for thereafter raising the thus-multiplied signal to a power with an exponential factor represented by a sum of terms by way of a parallel circuit including a resistor means with a voltage-dependent resistance, means for feeding the signal raised to said power to the input of the operational amplifier means which includes a circuit having resistor means and supplies an output current proportional to the sum of the input voltages to the integrating measuring means.

16. An apparatus according to claim 15, characterized in that the integrating measuring means includes a warning signalling means which produces a signal when the available battery capacity drops below a predetermined minimum value.

17. An apparatus according to claim 10, characterized by a first proportional difference amplifier means having a time delay means which forms from the magnitudes consisting of battery voltage and gassing voltage a magnitude at least substantially proportional to the difference voltage thereof, a function generator means operatively connected with said first difference amplifier means which produces from the difference voltage a magnitude proportional to the gassing current, a second proportional difference amplifier means operable to form by way of a first negative feedback network means a magnitude at least substantially proportional to the charging current, third proportional difference amplifier means for forming from the magnitude at least substantially proportional to the charging current as determined in the second proportional amplifier means and from the magnitude proportional to the gassing current a magnitude proportional to the difference thereof, means for feeding said magnitude proportional to the difference to the integrating measuring means, and means including the second proportional difference amplifier means and a second negative feedback network means connected thereto for raising the magnitude corresponding to the average discharge current as determined in the second proportional amplifier means by way of the second negative feedback network means to a power with said exponent before feeding the same to said integrating measuring means.

18. An apparatus according to claim 17, characterized in that the respective magnitude is fed to the measuring means by way of further stages.

19. An apparatus according to claim 17, characterized in that the magnitude proportional to the portion of the charging current serving for the gas development is fed to the input of an operational amplifier means which includes circuit means having resistance means for supplying an output current proportional to the input magnitude to a further integrating measuring means.

20. An apparatus according to claim 18, characterized in that the further integrating measuring means includes a warning signalling means which produces a signal when the electric charge corresponding to the entire gas development and representing a measure for the electrolyte quantity of the battery used up as a result of gassing exceeds a predetermined value.

21. An apparatus according to claim 20, characterized by an integral control means having an input and an output, the magnitude proportional to the voltage difference of the battery terminal voltage and the gassing voltage being fed to said last-mentioned input while a magnitude proportional to the desired value of the charging current appears at the output thereof, charging current control means including current-limiting means operatively connected to said integral control means, said integral control means comparing at least magnitudes proportional to the desired value and actual value of charging current and for preparing the amplified difference magnitude as control magnitude for the control of a charging apparatus.

22. An apparatus according to claim 10, characterized by an integral control means having an input and an output, the magnitude proportional to the voltage difference of the battery terminal voltage and the gassing voltage being fed to said last-mentioned input while a magnitude proportional to the desired value of the charging current appears at the output thereof, charging current control means including current-limiting means operatively connected to said integral control means, said integral control means comparing at least magnitudes proportional to the desired value and actual value of charging current and for preparing the amplified difference magnitude as control magnitude for the control of a charging apparatus.

23. A method for measuring the charge condition of galvanic energy sources by means of an integrating measuring device, comprising the steps of sensing at least one of the charging current, the discharging current and battery temperature, providing a signal having a magnitude at least substantially proportional to the charging current and a signal having a magnitude at least substantially proportional to the discharging current, modifying the signal magnitude which is at least substantially proportional to the charging current by at least weighting the signal magnitude with a charge factor dependent on the predetermined gassing voltage, which is variable with temperature and matched in its timely behavior to the charged condition of the energy source before feeding the resultant signal magnitude to the integrating measuring device, modifying the signal magnitude which is at least substantially proportional to the discharging current by multiplying the signal magnitude with a factor dependent on the respective sensed battery temperature and subsequently raising the thus multiplied signal magnitude to a power with an exponent formed by a sum of terms, whose one term itself is variable dependent on the battery temperature, before the resultant signal magnitude is in turn fed to the integrating measuring device, and feeding the signal magnitude at least substantially proportional to the charging current which signal magnitude is modified by the proportion of the gassing current which is dependent on the difference between the battery terminal voltage and the gassing voltage, as well as the signal magnitude proportional to the discharge current raised to the power having the exponent to the integrating measuring device.

24. A method according to claim 23, characterized in that the proportional signal magnitudes are the charging current and the discharge current.

* * * * *